Feb. 5, 1952

C. R. SACCHINI 2,584,229

FLUID OPERATED RECIPROCATING PISTON
TYPE WINDSHIELD WIPER MOTOR

Filed May 27, 1947

INVENTOR.
COLUMBUS R. SACCHINI
BY George M. Souch
ATTORNEY

Feb. 5, 1952 — C. R. SACCHINI — 2,584,229
FLUID OPERATED RECIPROCATING PISTON TYPE WINDSHIELD WIPER MOTOR
Filed May 27, 1947 — 2 SHEETS—SHEET 2
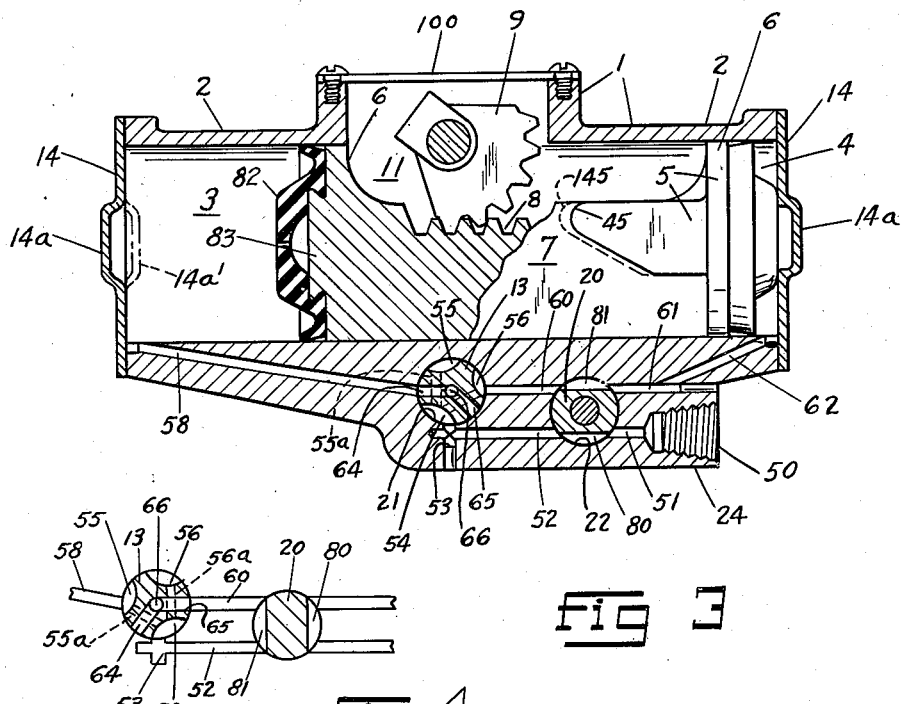
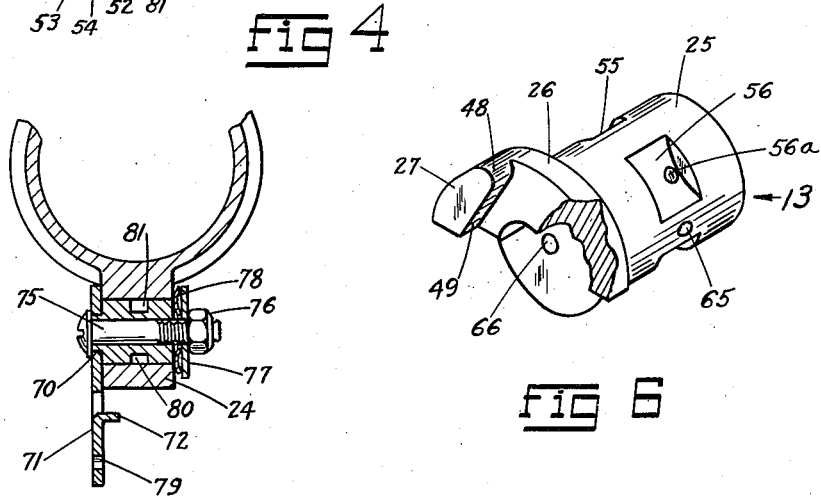
INVENTOR.
COLUMBUS R. SACCHINI
BY
ATTORNEY Patented Feb. 5, 1952

2,584,229

UNITED STATES PATENT OFFICE 2,584,229

FLUID OPERATED RECIPROCATING PISTON TYPE WINDSHIELD WIPER MOTOR

Columbus R. Sacchini, Willoughby, Ohio, assignor to The Marquette Metal Products Company, Cleveland, Ohio, a corporation of Ohio Application May 27, 1947, Serial No. 750,709

3 Claims. (Cl. 121—164)

This invention relates to an improved and simplified fluid operated motor of the type shown in C. R. Sacchini Patent 2,450,564, October 5, 1948, thus indicating the general object.

A further object is to provide a light weight and efficient fluid operated motor, the principal parts of which are adapted to be made inexpensively, either as die castings or simple sheet metal stampings, a concomitant object being to provide such a motor adapted and arranged to operate smoothly and quietly by elastic fluid such as air.

Another object is to provide an improved and simplified automatic fluid reversing valve and snap action mechanism therefor in conjunction with a fluid operated windshield wiper motor.

Another object is to provide an improved and simplified parking valve device for a windshield wiper motor, said device being manipulatable to control the wiper speed.

A specific object is to provide a quietly and positively operating valve reversing snap action mechanism for an elastic fluid operated motor.

Other objects include provision, in an elastic-fluid-operated motor, of an exhaust fluid discharging muffler operable as a lubricant reservoir for the fluid reversing valve, and a simple stroke adjustment device for the power piston of such motor.

Other objects and features of the invention will become apparent from the following description of the preferred form.

In the drawings:

Fig. 3 is a central longitudinal section through the motor as indicated on Fig. 2.

Fig. 4 is a fragmentary view showing parts of the supply system including the valves each shown in a position different from that illustrated by Fig. 3.

Fig. 5 is a detail cross sectional view of the speed control and parking valve as indicated on Fig. 1, and Fig. 6 is a perspective view of the reversing valve plug partly broken away.

Figure 1:
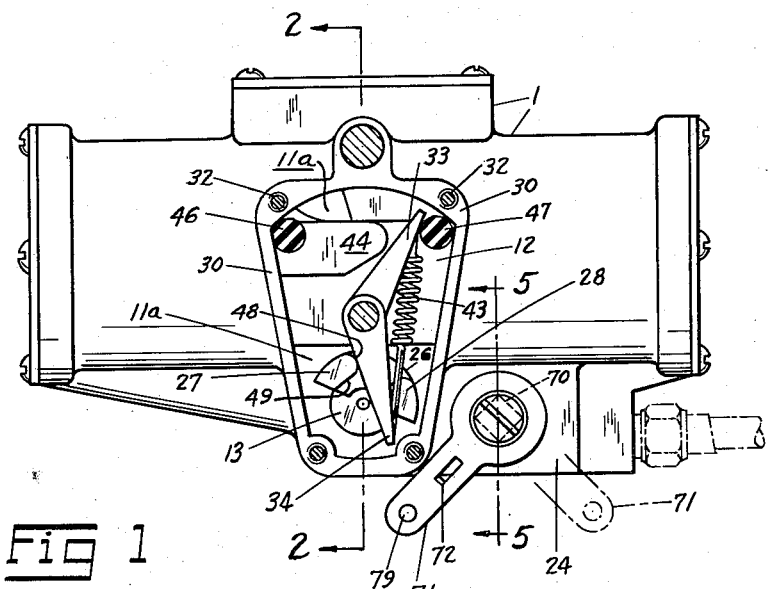
Fig. 1 is a side elevation of the motor, designed for operation by elastic fluid, a cover plate for a cavity enclosing the reversing valve mechanism of the motor being broken away as along the line 1—1 of Fig. 2.

A main housing 1 of the motor, preferably a die casting, has substantially identical opposed, aligned cylinder portions 2 forming pressure chambers 3 and 4 in cooperation with a power piston 5 and reversible cylinder head closure plates or discs 14. The power piston, also preferably a die casting, has cylindrical disc-like heads 6 rigidly connected by a stem or rod portion 7 having rack teeth 8 formed thereon. The rack teeth are in constant mesh with a gear sector 9 disposed within a central enlarged chamber-forming portion 11 of the housing defining a working space for the piston rod and gear sector in open communication with a lateral enlargement 11a of said space containing a snap action toggle mechanism generally designated 12 for an automatic fluid reversing valve plug 13 of the motor described later herein.

The gear sector 9, also preferably a die casting, is supported by a power takeoff shaft 15 connected therewith as by a removable screw threaded pin 16. The opposite ends of the shaft 15 extend through respective bearing formations 17 of the housing 1, one end of the shaft being adapted, as by spline serrations 18 thereon, to carry a windshield wiper drive arm (not shown). The other end may have an emergency operating arm 19 pinned thereto in the event of fluid supply pressure failure. The arm 19 is so positioned as to be readily available for manual operation in the mounted position of the motor unit. The shaft 15 usually extends through the windshield framework or an adjacent vehicle body wall, and mounting connections (not shown) are secured to the housing 1 as usual.

The automatic reversing valve plug 13 (Figs. 2, 3, 4 and 6) and a main fluid control and parking valve plug 20 (Figs. 3, 4 and 5) are disposed in parallel relationship in suitable bores 21 and 22 respectively in a thickened bottom portion 24 of the housing lengthwise thereof at one end.

The reversing valve plug 13 (see particularly Fig. 6) is preferably a die cast body cylinder 25 having a concentric semi-cylindrical or half disc enlargement 26 at one end carrying identical integral abutments 27 and 28 projecting from the supporting half disc in parallel relationship to each other and spaced apart circumferentially about the axis of the plug 13.

The snap action toggle mechanism 12 (Figs. 1 and 2) is disposed in the chamber 11a defined in part by a continuous housing wall 30, Fig. 1, complemented by a readily removable cover plate 31 which is the sole support for the toggle mechanism anad may be secured to the wall 30 as by screws 32. The toggle mechanism comprises a motor-actuated toggle arm 33 and a valve actuating toggle arm 34, both adapted to be made as nearly identical sheet metal U-shaped parts. At least two toggle arm portions (35 and 36 as shown) are pivotally secured together and to the cover plate 31 as by a non-binding rivet 37 passing through said arm portions and the cover plate. As shown the remaining arm portions 39 and 40 are also pivotally connected by a non-binding rivet 41 having no support other than that afforded by the toggle arms. End indented or crotch portions 42 of the toggle arms support respective eye formations of a coiled tension spring 43 which tends to maintain the arms in disaligned or snapped-over relationship (one such position illustrated in Fig. 1) at opposite sides of their aligned or dead center positions with respect to the connecting pivots 37 and 41.

To operate the toggle mechanism, the piston stem or rod portion 7 has integrally formed thereon abutment shoulders 44 and 45 (Figs. 1, 2 and 3) positioned for engagement with opposite edges of the toggle arm portion 39 (see Fig. 2) during movement of the piston in respectively opposite directions.

To limit the throw of the motor operated toggle arm 33 and to arrest said arm without impact noise, the cover 31 carries and/or retains in position abutment blocks or stops 46 and 47 of elastic material such as synthetic rubber disposed in the path of the toggle arm and which, as shown by Fig. 1, are laterally supported by respective opposite inner wall surfaces of the wall 30 of the chamber 11a. The cushion blocks, as shown, are generally cylindrical and necked between their ends for support in openings (not shown) in the cover plate 31, the plugs being snugly force-fitted into the openings.

The valve actuating toggle arm 34, in each arrested position of the toggle mechanism, extends, with approximately zero clearance (see Fig. 1), between the abutments 27 and 28 of the valve plug 13 and is forced by the spring 43 alternately against those abutments to turn the valve plug from one position of rest to the other. When the toggle arm 34 has turned the plug through the necessary angle (e. g. 60 degrees) to reverse introduction and exhaust of pressure fluid in respect to the pressure chambers 3 and 4, said arm is brought smoothly to rest in engagement with respectively different face portions of the abutments as will be evident from inspection of Fig. 1. Each abutment 27 and 28 has a rounded face portion 48 engaged by one edge of the inner toggle arm portion 40 as that same arm portion engages a flat face 49 on the other abutment in the arrested, zero moment arm, position of the toggle arm 34.

When the toggle arms, by operation of the piston 5, are brought into dead center alignment, the arm 33 usually snaps into engagement with one of the cushioned stops 46 or 47 and the contracting spring 43 then jerks the valve plug to reversed position by action of the toggle arm 34 on the appropriate one of the rounded abutment faces 48. Because there is substantially no clearance between the toggle arm 34 and either abutment 27 or 28 in each arrested position of the toggle mechanism, there is no clicking noise accompanying valve reversing movements of the valve actuating toggle arm.

The supply duct system for operating fluid is entirely illustrated in Figs. 3 and 4 and, essentially, is the system shown in U. S. Patent 2,450,564. A threaded inlet 50 leads the operating fluid through a small bore 51 to the parking and control valve bore 22 past the latter at 52 to a vertical short bore 53 intersecting the reversing valve bore 21. The reversing valve plug portion 25 has a manifold cavity 54 which is always in communication with the bores 52 and 53. Alternately acting cavities 55 and 56 generally opposite the cavity 53 and in the transverse plane thereof are connected with the manifold cavity 53 by identical oblique bores 55a and 56a in the plug body. The cavity 55 in the position of the plug 13 illustrated in Fig. 4 opens the supply pressure source to communication with a bore 58 leading to the pressure chamber 3. In the position of the plug 13 illustrated in Fig. 3 the cavity 56 opens the pressure source to communication with a bore 60, a continuation 61 thereof beyond the control valve bore 22 and a branch 62 of said bore 61 for communication with the pressure chamber 4.

In the positions of the various parts illustrated in Fig. 3, the piston will immediately begin moving to the left reversing the position of the valve plug 13 (see Fig. 4) at the end of the leftward piston stroke, thus re-initiating a piston stroke to the right.

As the piston moves to the left from the position illustrated in Fig. 3, spent fluid is forced from the pressure chamber 3 through the bore 58 to one of a pair of relatively obliquely positioned radial bores 64, 65 of the valve plug 13 communicating at their inner ends with a common axial exhaust bore 66 formed in the valve plug. The outer end of the exhaust bore 66 opens into a muffler chamber 67, Fig. 2, containing fluid-pervious, sound-deadening material such as felt which also serves to retain lubricating oil to supply the complementary surfaces of the valve plug and its receiving bore therewith. The felt is contained in a cup-shaped retainer 68, having a central exhaust fluid outlet hole 69.

The body 20 of the speed control and parking valve is generally cylindrical as shown by comparison of Figs. 3 and 4, one end having a non-circular reduced portion 70 entering a complementary non-circular opening in a sheet metal operating arm 71 by which the control and parking valve may be turned from its illustrated "full on" position, Fig. 3, through gradually restricting fluid supply positions to the "full off" or "parking" position, Fig. 4, further denoted by the broken line showing of the arm 71 in Fig. 1. The arm 71 has a stop finger 72 struck therefrom for engagement with the bottom portion 24 of the housing in the "full on" and "full off" positions.

The valve plug 20 is secured in the bore 22 by a screw or bolt 75, the self-locking nut 76 of which forces a spring washer assembly 77, 78 against said portion 24 of the housing frictionally to hold the valve in adjusted position. The free end of the arm 71 has an opening 79 for attachment of an operating rod or link in the event the installation is such that the arm 71 cannot conveniently be reached by the operator of the vehicle served by the wiper motor.

The operation of the valve plug 20, etc. for parking (assuming the plug has been turned to the Fig. 4 position so that the diametrally opposite recesses 80 and 81 are vertical and assuming further that the reversing valve plug 13 is still in the Fig. 3 position) is as follows: Fluid entering the bore 51 flows upwardly through the recess 80 directly to the bore 61, thus by-passing the automatic reversing valve plug 13. That drives the power piston 5 to the left (Fig. 3) to the end of its stroke, reversing the position of the valve plug 13, enroute, through the intermediary of the toggle mechanism. In the meantime (still assuming the valve plug 13 is in the Fig. 3 position) exhaust fluid leaves the pressure chamber 3 as already described. If the piston 5 is moving toward the right (before tripping the toggle mechanism) at the time the parking end and control valve plug 20 is turned to parking position, then (see Fig. 4) the exhaust fluid from the pressure chamber 3 leaves the bore 58 through the cavity 55, oblique passage 55a, and manifold cavity 54 of the plug 13, bores 53, 52, recess 81 of plug 20, bore portion 60 and radial bore 65 of the plug 13.

Figure 2:
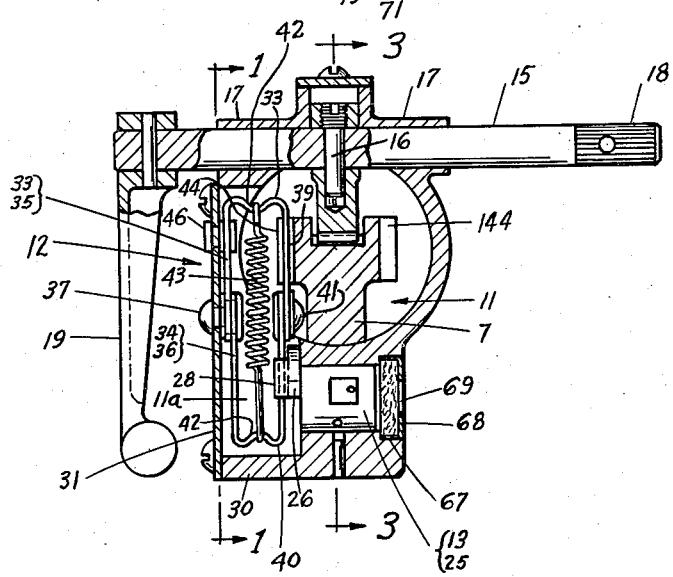
Fig. 2 is a sectional view through the mechanism as indicated on Fig. 1.

The arrangement for enabling, selectively, long and short stroke operation of the power piston 5 is shown in Figs. 2 and 3. Those figures show, partly in dotted lines, additional toggle-mechanism-operating abutments at 144 and 145 spaced less wide apart than the abutments 44 and 45 so that the toggle mechanism is tripped or moved past its dead center positions at shorter intervals in respect to the travel of the piston at a given speed. Adjustment of the mechanism for long and short stroke operation requires simply removal of the cylinder heads 14 and a cover plate 100 (so that the gear sector 9 may be removed) and then removal and reversal of the piston end for end and side for side. Concomitantly the cylinder heads 14 are reversed in position in accordance with the change, whether for long or short stroke, so that piston abutting embossed portions 14a on the cylinder heads are either turned outwardly as illustrated in full lines or inwardly as partially illustrated in broken lines at 14a'. The embossed abutments 14a engage readily removable impact-cushioning and sealing discs 82 of elastic material which are expanded over flanged projections 83 integral with the piston casting to limit the tendency for the piston to overtravel to an undesirable extent at high operating speeds of the motor. The two sets of abutments 44, 45 and 144, 145 have a further advantage in that they balance the piston against tending to rotate out of operating position in the cylinder bores (see Fig. 2).

Incidentally, by reason of the inherent tendency for the piston to overtravel when elastic fluid is used to operate the motor, the reversible piston heads 14 may be used in some cases roughly to control or adjust the length of wiper stroke at high speeds without having to reverse the piston. In that case, one of the cylinder heads may be left in its full line illustrated position and the other reversed to the broken line illustrated position, whereby the piston will be enabled to move farther from mid position in one direction than in the other.

I claim:

1. A reciprocating fluid operated motor comprising a casing having opposed cylinders, a unitary piston with head portions slidable in the cylinders and a rod portion connecting the heads, fluid supply means for the cylinders including automatic reversing valve means in the casing, abutments on one side of the rod portion of the piston spaced apart longitudinally thereof for operating the reversing valve means, and more widely spaced abutments on the opposite side of said rod portion for longer-piston-stroke operation of the valve means in an end-for-end reversed position of the piston in the cylinders.

2. A snap action toggle mechanism for a fluid operated motor of the type having a reciprocatable piston means and a rotatable valve means for controlling the operation of the piston means, said mechanism including spring-connected coaxially pivoted toggle arms operatively interconnecting said valve means and said piston for driving said valve means with alternate rotary motion upon reciprocation of said piston, one of the toggle arms acting against circumferentially spaced abutments on the rotary valve means to turn the latter, said one toggle arm and the abutments moving in counter-directional arcuate paths about different centers and the abutments and arm having complementary faces brought gradually into full face-to-face arresting contact at regions lying on both sides of a line perpendicuar to said faces and passing through the turning center of the valve, the clearance between the toggle arm and both of the abutments being approximately zero in each arresting position of the toggle arm and valve.

3. In a fluid pressure operated reciprocating motor, having opposed pressure chambers, a fluid supply duct, automatic valve means in said duct for alternately supplying pressure fluid therefrom to the chambers, and a parking valve including a valve bore intersecting and interrupting the supply duct and one of the feed ducts, said plug having non-communicating radially open valving recesses on diametrally opposite sides operable in one position of the plug to establish supply fluid connections to the automatic valve means and from the automatic valve means to said one of the chambers and operable in the other position to block fluid flow to and from the automatic valve means and simultaneously render portions of the ducts effective to supply operating fluid to said one of the chambers for parking.

COLUMBUS R. SACCHINI.

REFERENCES CITED

The following references are of record in the file of this patent:

UNITED STATES PATENTS

| Number | Name | Date |
|---|---|---|
| 1,048,816 | Falcke | Dec. 31, 1912 |
| 1,395,604 | Skinner | Nov. 1, 1921 |
| 1,430,505 | Hinchman | Sept. 26, 1922 |
| 1,458,922 | Rivera | June 12, 1923 |
| 1,663,666 | Moskovitz et al. | Mar. 27, 1928 |
| 1,905,510 | Russell | Apr. 25, 1933 |
| 2,241,766 | Coffey | May 13, 1941 |

FOREIGN PATENTS

| Number | Country | Date |
|---|---|---|
| 473,296 | Great Britain | Oct. 11, 1937 |